Oct. 20, 1936.   H. R. GUNDLACH   2,057,677
COLORED ROOFING GRANULE
Filed Nov. 17, 1933
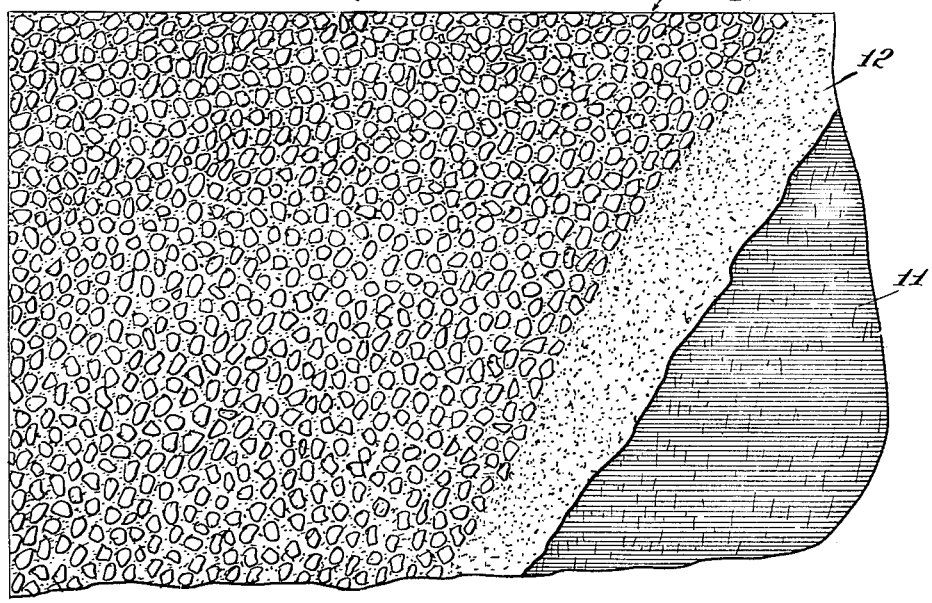
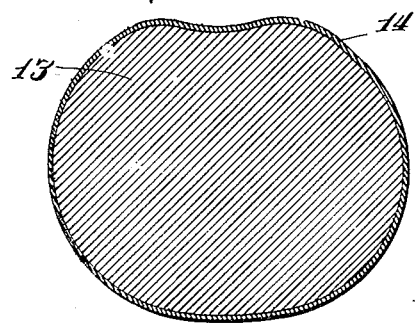
Inventor
Henry R. Gundlach
By Gillson, Mann & Cox
Attorneys Patented Oct. 20, 1936

2,057,677

UNITED STATES PATENT OFFICE 2,057,677

COLORED ROOFING GRANULE

Henry R. Gundlach, Baltimore, Md., assignor to Central Commercial Company, a corporation of Illinois Application November 17, 1933, Serial No. 698,436

22 Claims. (Cl. 91—70)

This invention relates to roofing granules and has for one of its objects to provide a coating for holding the coloring pigment to the surface of the roofing granule, which is substantially insoluble, resistant to wear and weather, adheres with great tenacity to the surface of the granule, is easy to apply and is relatively cheap; and to provide a process by which such coatings may be supplied to the roofing granules in commercial quantities.

Another object of the invention is the provision of granules having color pigment permanently attached thereto with a binder that is relatively insoluble.

A further object of the invention is the provision of a new and improved composition roofing having a coat of granules artificially colored by color pigment secured to the surface thereof by a new and improved water and weatherproof binder.

Other and further objects of the invention will appear from the following description taken in connection with the accompanying drawing, in which—

Fig. 1 is a plan view of a portion of a strip of roofing material showing the granules in position thereon; and Fig. 2 is a plan view on an enlarged scale of one of the granules showing the color coating thereon.

The demand for brilliant color in architectural structures has made it necessary that prepared roofing be furnished in extremely brilliant tones. Previously, the surface of prepared roofing has consisted of granules of crushed rock which are embedded or stuck in the asphalt surface of the roofing. Where color was required, it was usual to make the granule of crushed slate which occurs naturally in soft green and deep red tones. The more brilliant colors are usually comparatively expensive mineral salts. Many do not occur in nature at all, but are manufactured and in commerce appear as a fine powder. Consequently, because of prohibitive cost, and unsuitable form, it is impossible to use many crushed mineral pigments alone as coloring agents for the roof. Even when no coloring functions are involved, granules increase the life of the roof and untreated ground rock is often applied to protect the roofing from wear and abrasion. It is now customary to paint or coat these necessary granules to give the roofing the desired color.

In the preparation of composition roofing 10 (see Fig. 1), a suitable sheet of felt 11 is employed for constituting a proper foundation for the roofing material. This felt is impregnated with suitable water-proofing material, as is usual in such constructions. After the felt has been treated with a water-proofing material, a coat of asphalt 12, or the like, of a comparatively high melting point is applied to the sheet 11. Granules 13, which have previously been treated to apply color pigment to the surface thereof, are then embedded in the asphalt coat 12.

Color pigment is applied to the surface of the granules by providing a suitable binder which will form a coating 14 surrounding the granules.

Various means of applying pigment coatings have been employed, among which are paint vehicles to stick the pulverized color to the surface of the granule and certain of the well-known inorganic cements. The difficulties which these processes cause are first: The vehicle weathers severely and produces a roof which is brilliantly colored only for a relatively short time; second, the inorganic cements have a tendency to stick the whole mass together as the color coating is being applied to the granules and give considerable trouble because the coatings usually are not absolutely weatherproof.

The mechanical structures which I postulate from my present information and the behavior of the materials are to be understood as comprising almost immeasurably small arrangements of the particles involved—their size and spacing are small multiples of molecular diameters. With this in mind, I offer the following explanation of my invention:

I find that a structure may be built up upon the surface of the roofing granules which mechanically entangles the individual particles of an inert coloring agent; that this structure may be rendered highly insoluble and very resistant to wear and weather. I have found also that the admixture of certain metallic salts which form definite known crystalline compounds add materially to the bonding power of the coating which I apply.

The following processes are described in detail by way of example only, since it will be recognized that the chemical reactions occurring therein are characteristic of a wide range of compounds and elements, and that many compounds could be substituted for those herein enumerated without departing from the spirit of the invention or in any way changing the useful nature of the final product.

As the first step in producing the coating of colored roofing granules, I grind slate or some other suitable mineral to substantially uniform size. The slate is then sifted between narrow screen limits and the selected particles are freed from dust.

The color pigment may be attached to the granules in any of the following methods, each of which gives satisfactory results:

Wet method #1

Four pounds of casein are soaked in ten pounds of water until the casein is thoroughly hydrated. When hydration is complete, six pounds more water is added.

Twenty pounds of chemical-grade hydrated lime, four pounds of zinc oxide and twelve pounds of any coloring pigment which is chemically inert and will stand the subsequent temperatures are mixed and ground together with a little water. Then forty to fifty pounds of water are added. The pigmented mixture is then added to the hydrated casein and thoroughly stirred. This mixture is added to one ton of granules and stirred until the granules are uniformly coated. It is then dried at the lowest practicable drying temperature which usually ranges from 140° F. to 180° F. When dried too slowly at lower temperatures than the above, the coating has a tendency to form "age-cracks" and as the temperature greatly exceeds the limits given, drying and shrinking cracks become very objectionable. The dried granules are then coated with about one hundred pounds of a sodium silicate solution in which I prefer that the $Na_2O$ component of the sodium silicate bear a ratio to the $SiO_2$ component as one is to two. This solution is allowed to stand on the granules for about one-half an hour until the reaction is complete.

It is my belief that the silicate reacts with part of the lime to form calcium silicate which is insoluble and that at the same time silica gel is formed into which some of the lime is adsorbed. The proportion of lime added to the original casein solution is sufficient to provide an excess over the demands of the silicate in this reaction to insure the fact that no sticky silicate is left to cause the particles to agglomerate. The zinc oxide is converted into zinc silicate.

I have found that the coating at this time consists of calcium silicate, silica gel, silica and calcium hydroxide. I believe that most of the calcium hydroxide is mechanically entangled in the pores of the gel. The process may be stopped here with a drying operation which exposes the granules either to warm air or to furnace gases at a temperature of about 500° F. from which the excess calcium hydroxide extracts the $CO_2$ and forms the insoluble calcium carbonate. This reaction is necessarily incomplete.

I may, however, produce a harder, more adherent and less soluble coat by converting the excess calcium hydroxide into a fluoride and, accordingly, I prefer to continue the manufacture of my improved roofing granules with either of the two following processes:

Thirteen pounds of magnesium fluo-silicate ($MgSiF_6$) are added to a ton of granules and the mass covered with water. This treatment should continue for about twelve hours during which time the water should be continuously circulated to insure its changing contact with all the granules and to complete the chemical reaction.

The excess moisture is then removed and the granules are dried at a temperature in excess of 200° F. Magnesium fluo-silicate converts the calcium hydroxide into calcium fluoride which is very insoluble. Magnesium fluoride and silicon dioxide are also formed and deposited on the granules and are themselves quite insoluble. Some of the magnesium fluoride and the fine silicon dioxide, however, are washed away.

In place of magnesium fluo-silicate, I may use sodium fluoride. In that case, sodium fluoride is added in a water solution and is allowed to stand for several hours. The sodium fluoride converts the calcium hydroxide to calcium fluoride. The soluble sodium products are washed away.

As previously discussed, this process is successful in building up upon the surface of the granule a lattice-like structure which adheres to the surface and entangles the particles of color which throughout the process have been present only in a mechanical sense and have taken no part in the chemical reactions.

I have found that the presence of zinc oxide in the original mixture is of advantage because zinc makes a definite crystalline silicate, the interlacing crystals of which appear to increase the adhesion of the mass.

Good economics alone dictates the use of calcium hydroxide. Calcium carbonate, whiting, barium and strontium carbonates produce coatings of almost equal durability. In fact, the simple chemistry here involved instructs us that any relatively insoluble easily replaceable salt of the metals occupying a position in the upper portion of the electro-motive series is a suitable material, and may be used.

As will be seen in the prior discussion, the casein does not necessarily enter into the chemical reactions and serves principally as a cheap and effective means for temporarily holding the coat of calcium hydroxide and zinc oxide upon the surface of the granule. I prefer it because its reaction product with calcium is insoluble. It is evident, however, that any adhesive agent might be used and I have attained satisfactory results from rosin dissolved in its chemical equivalent of $Na_2CO_3$ or solutions of dextrin, glucose, gelatin and the like. Some of these materials peel more than others, but all with proper care may be made to produce satisfactory results.

All soluble silicates can be used, potassium and sodium interchangeably, and their reaction with the extended surface of the metallic oxides already upon the granule builds up an entangling lattice structure which persists throughout the subsequent processes and successfully holds the colored pigment particles within its pores.

The process which I use to render more insoluble the coating which is formed by the second step, is not necessarily confined to fluorides, and I have obtained satisfactory results by changing the excess hydroxides to other substantially insoluble salts. For instance, I may treat the granules with a solution of di-sodium phosphate to produce the insoluble phosphate upon the surface of the granule. Alternately, I may use sodium carbonate to convert the hydroxides to the more insoluble carbonate form, and, again, I may use the phosphates and carbonates of other metals than sodium which still are capable of producing the insoluble phosphates or carbonates which are desired.

It will thus be seen that the process comprises the following steps: First, the spreading upon the surface of a granule of a coating of the oxide, hydroxides, or carbonates of electro-positive metals; second, the converting of the oxide, hydroxide, or carbonate to a crystalline, entangling silicate and silica lattice; the provision of an excess of the above salts within the lattice to prevent the agglomeration of the particles; and the subsequent conversion of the more soluble salts upon the surface of the granule to an insoluble form.

Instead of applying the color coating to the granules in the manner outlined above, the same may be applied in the following manner:

Dry method #1

The granules are mixed in the dry state with calcium hydroxide, zinc oxide and color pigment in the proportions stated above. Sodium silicate solution in the same concentration and amounts, as outlined above, may then be added to the mass and the same thoroughly mixed. The mass is then dried and simultaneously agitated to prevent agglomeration, after which the granules may be treated with a fluoride or other fixing chemical.

Wet method #2

As a modification of wet method #1 outlined herein, zinc oxide in equivalent amounts is substituted for the calcium hydroxide employed in that method, and a small amount of lime is added to the casein to make a good adhesive. The process is otherwise the same as that outlined in the wet method #1.

Dry method #2

Zinc oxide, granules and color pigment are mixed in proportions the same as in wet treatment #2. If desired, the granules may be moistened before the zinc oxide and color pigment are added. A sodium silicate solution, in the same concentration and amount as employed in wet process #1 is added. The mass is thoroughly agitated and dried, after which an acid solution of zinc chloride, 10% to 30% zinc chloride in water, is added to the mass. The mass is agitated, and, after six to twelve hours, the reaction is complete. The amount of zinc oxide used is in excess over that required to react on the sodium silicate and the zinc chloride reacts on this excess zinc oxide to produce the insoluble oxychloride. The mass is then thoroughly washed and dried in the manner outlined.

This is a substitution in part of my application Serial No. 489,485, filed October 17, 1930, and which became abandoned on May 19, 1933.

I claim as my invention:—

1. In roofing material, a roofing granule, an infused color coating for said granules comprising an entangling lattice of insoluble silicates of metals at the top of the electro-motive series and insoluble metallic fluorides, and an inert color pigment held within the lattice and a binder for connecting said pigment to said granules.

2. The method of coating roofing granules which comprises making a suspension of metallic chemical compounds and an inert pigment in a suitable binding vehicle, coating the mass of granules with the suspension, treating the coated granules with soluble silicates in amount less than required to react on the entire amount of metallic compounds to form substantially insoluble silicates and subsequently treating the silicated granules with a compound containing fluorine to react with the excess of the original metallic chemical compounds.

3. The process of attaching a colored coat to a roofing granule which consists in coating the granule with a mixture containing calcium hydroxide suspended in a suitable casein binder causing the hydroxide to react with sodium silicate to form calcium silicate providing an excess of calcium hydroxide to exhaust the sodium silicate in the reaction, whereby the mass is prevented from sticking together, and subsequently treating the mass with a fluoride for converting the excess hydroxide into calcium fluoride to produce a more resistant and insoluble coat.

4. In the manufacture of colored roofing granules, the steps of manufacture which include coating the granule with a coloring agent, an organic binder and a chemical excess of a metallic compound, drying the mass, treating the same with a silicate for converting a part of the metallic compound into an insoluble silicate, dehydrating the silicate and treating the mass with a fluoride for converting the remaining excess of the metallic compound into an insoluble compound.

5. In the manufacture of roofing granules that method of preventing soluble silicates from sticking the mass together which consists in coating the granules with a composition comprising casein, color pigment and an alkaline earth composition in excess, then applying a coat of soluble silicate to said first-named coating and then drying the mass without fusing the same.

6. The process of attaching a colored coat to a roofing granule which consists in coating the granule with a suspension containing casein and an alkaline earth compound, the coloring agent and zinc oxide, and subsequently converting the oxide adhering to the granule into silicate without fusing the oxide.

7. The method of coating roofing granules which comprises making a suspension of metallic compound and an inert pigment in a suitable binding vehicle, coating the mass of granules with the suspension, treating the coated granules with soluble silicates to form substantially insoluble silicates, and subsequently treating the silicated granules with a solution of magnesium fluo-silicate to convert the excess of metallic compound into metallic fluorides.

8. The method of coating roofing granules which comprises making a suspension of metallic compounds and an inert pigment in a neutral binding vehicle, coating the mass of granules with the suspension, treating the coated granules with soluble silicates to form substantially insoluble silicates, and subsequently treating the silicated granules with a solution of sodium fluoride to convert the excess of metallic compounds into metallic fluorides.

9. A method of coating roofing granules which comprises coating the granules with a composition of casein, color pigments, calcium oxide in excess and zinc oxide, drying the coat and then coating the granules with a coat consisting of a soluble silicate and finally, after a small space of time, subjecting the granules to a bath containing a fluoride that will convert any free calcium hydroxide into an insoluble fluoride and drying the mass.

10. A method of coating roofing granules which consists in coating the granules with a composition consisting of color pigment, a binder, a hydroxide of an alkaline earth in excess and zinc oxide, drying the coat, coating the granules with a soluble silicate, drying the coat and finally treating the granules with a fluoride that will convert any of said hydroxide left free on the granules into a fluoride.

11. A method of coating roofing granules which comprises coating the granules with a composition of casein, color pigment, an alkaline earth compound and zinc oxide, drying the coat, then treating the colored granules with a soluble silicate and finally drying the mass by the application of heat said granules being unaffected by the composition of said coat.

12. A method of coating roofing granules which comprises mixing granules, zinc oxide, color pigment, adding a soluble silicate solution in insufficient quantities to react on all the zinc oxide, agitating and drying the mass and then adding a composition that will react on the excess zinc oxide to form an insoluble compound without affecting said granules and finally drying the mass.

13. Colored granular material suitable for use in the manufacture of composition roofing comprising individual granules, each of which has deposited thereon a zinc silicate, entangled within the interlaced crystals of which are colored pigments for giving the granules the desired color.

14. Colored granular material suitable for use on composition roofing comprising individual granules of mineral matter, each granule of which has color pigment attached thereon by a binder including the insoluble silicates of group II of the periodic classification of the elements including zinc silicate.

15. Colored granular material suitable for use in the preparation of composition roofing comprising individual granules each of which is colored by pigments secured thereon by a binder including zinc silicate.

16. A roofing material comprising a base having secured on one surface thereof a layer of granules as set forth in claim 14.

17. A roofing material comprising a strip of felt impregnated with a waterproof composition and having granules as set forth in claim 14 secured on one surface of the felt by an asphaltic composition.

18. A method of coloring granules for use on composition roofing comprising preparing a mixture of granules of mineral matter with a hydroxide of the calcium group, color pigments and water, converting a portion only of said hydroxide into an insoluble phosphate, applying heat to dry the mass, and simultaneously agitating the mass to prevent agglomeration.

19. A method of coloring granules for use on composition roofing comprising preparing a mixture of granules of mineral matter with a hydroxide of the calcium group, color pigments, zinc oxide, water and a soluble compound having a phosphate radical, applying heat to dry the mass and agitating the mass to prevent agglomeration during the drying operation.

20. A method of coloring granules for use on composition roofing comprising preparing a mixture of granules of mineral matter with a hydroxide of the calcium group, color pigment, sodium silicate, water and a soluble compound having a phosphate radical, applying heat to dry the mass and agitating the mass to prevent agglomeration during the drying operation.

21. In roofing material, a roofing granule, a color coating for said granules comprising a coloring pigment secured to the granules by an adhesive formed from chemical compounds comprising hydrated lime and held in an entangling lattice built up upon the surface of the granule which lattice is composed of a reaction product of zinc and silicate compounds.

22. The process of entangling an inert color pigment upon the surface of a roofing granule which consists in making an intimate suspension of a pigment and metallic chemical compounds including a zinc compound in a neutral vehicle and coating the granules with the suspension and a soluble silicate whereby the chemical compound is converted into an entangling structure which embeds the pigment particles and which itself is substantially insoluble.

HENRY R. GUNDLACH.